July 24, 1951   C. J. CARLSON   2,561,650
CULTIVATOR ATTACHMENT
Filed Sept. 7, 1946   3 Sheets-Sheet 2
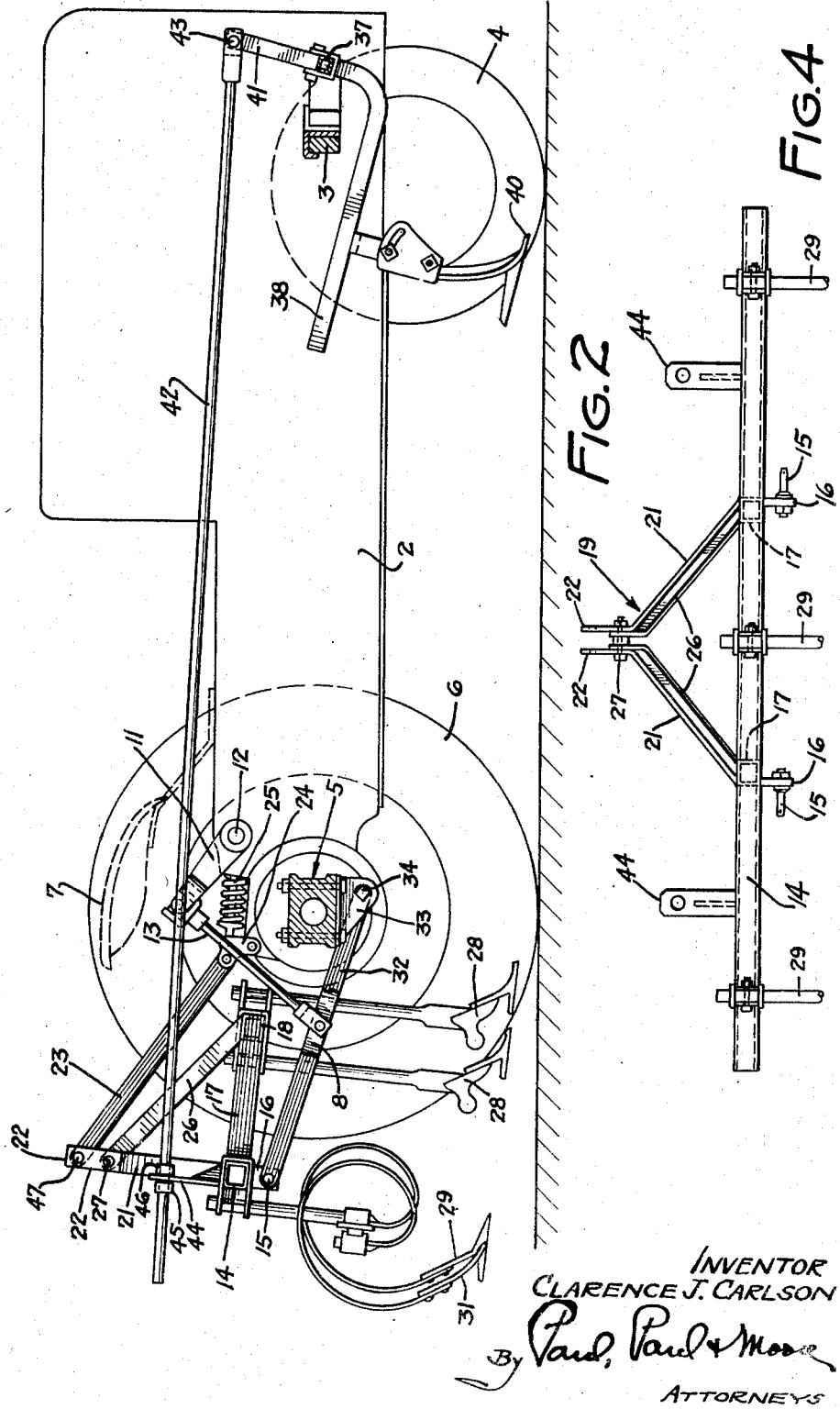
INVENTOR
CLARENCE J. CARLSON
By Paul, Paul & Moore
ATTORNEYS

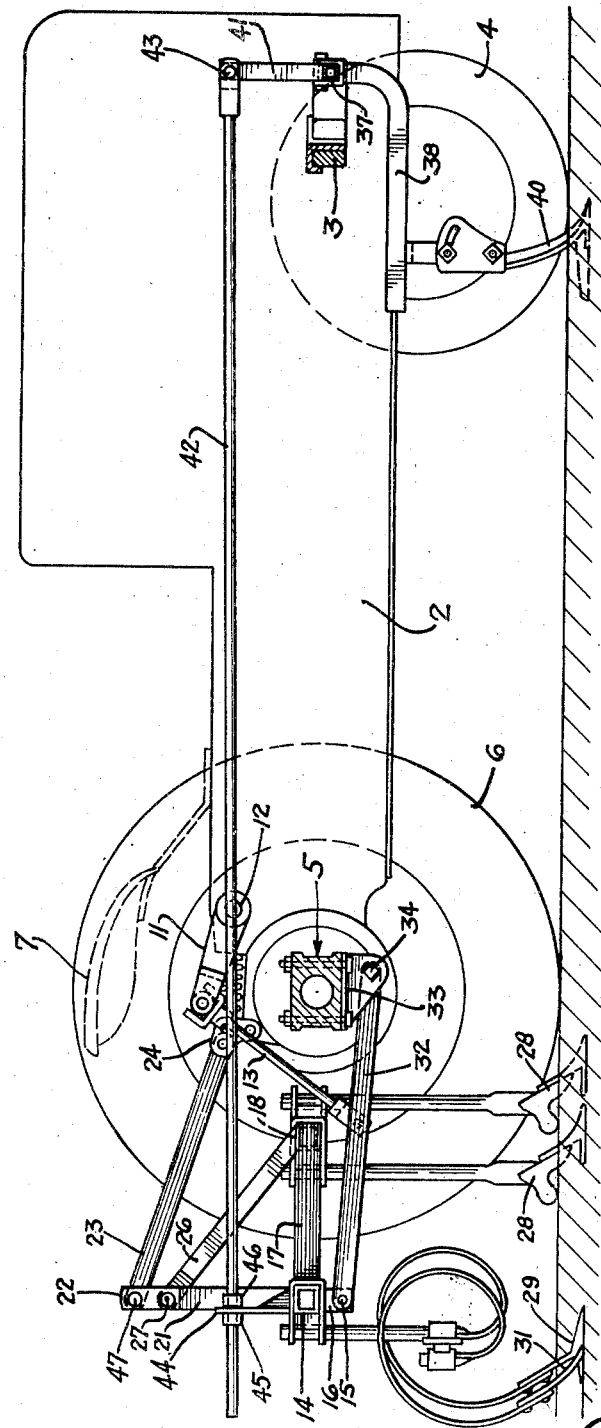

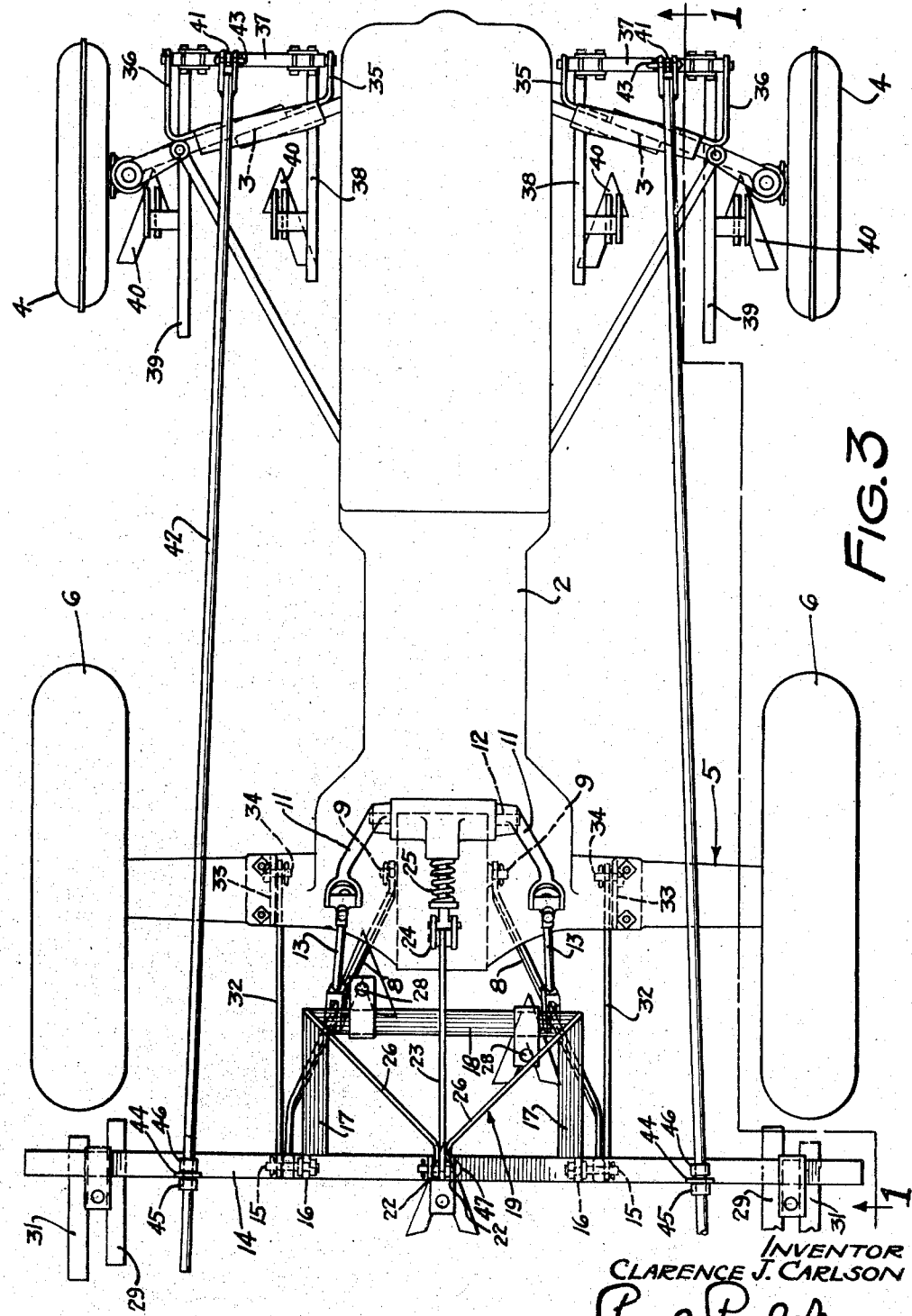

Patented July 24, 1951

2,561,650

UNITED STATES PATENT OFFICE 2,561,650

CULTIVATOR ATTACHMENT

Clarence J. Carlson, Marshalltown, Iowa

Application September 7, 1946, Serial No. 695,391

3 Claims. (Cl. 97—47)

This invention relates to new and useful improvements in cultivator attachments, and more particularly to such an attachment adapted to be connected to the rear end of a tractor.

When cultivating crops, it is extremely important that the ground-engaging tools be operated in the ground in a certain relation to the plant rows so that they will not damage or injure the roots of the plants. Many crops require early cultivation, and when the plants are small, extreme care must be exercised when cultivating to avoid injury and/or covering the plants. This requires that the ground-engaging tools be accurately guided in their travel so as not to come too close to the plants, and also that the depth of the tools in the ground be maintained substantially constant, regardless of undulations and irregularities in the ground's surface.

There are now in use numerous cultivator attachments for tractors, but to the best of my knowledge none of these is entirely satisfactory and practical in operation, largely because the ground-engaging tools are usually spaced a considerable distance back of the rear axle of the tractor whereby undulations in the surface of the ground may cause the ground-engaging tools to penetrate too deeply into the soil at times, and at other times their penetration may be very shallow. Also when the ground-engaging tools are positioned a considerable distance back of the rear axle of the tractor, the cultivator attachment may sway more or less from one side to another, which obviously is very objectionable in that it makes it extremely difficult for the operator to cause the tools to follow the plant rows in a more or less predetermined relation thereto.

It is, therefore, highly desirable that a cultivator attachment for tractors be provided whereby all of the objectionable features now inherent in most known cultivator attachments of this type have been eliminated, and also whereby contour cultivation at its best may be obtained without the operator exercising extreme care in the handling of the tractor, and whereby the cultivation of crops with a tractor utilizing the novel attachment herein disclosed may be expeditiously accomplished with a minimum of fatigue and with the assurance that little or no injury is inflicted upon the plants undergoing cultivation.

An object of the present invention, therefore, is to provide a cultivator attachment for tractors which embodies all of the desirable features required in such an apparatus, and which is extremely simple and convenient to operate.

A further object is to provide a cultivator attachment comprising a transversely-disposed elongated frame member having means thereon for supporting ground-engaging tools, and said frame member having a forwardly-extending portion which is so fashioned that the forward transverse portion thereof is disposed in close proximity to the rear axle, whereby ground-engaging tools supported thereon will follow substantially the up-and-down movement of the traction wheels as they travel over the ground's surface, thereby causing the ground-engaging tools to operate at substantially a uniform depth in the ground, regardless of irregularities and undulations in the surface of the ground over which the tractor travels.

A further object is to provide a cultivator attachment of simple and inexpensive construction, which is so designed that it readily lends itself for use in conjunction with certain types of tractors provided with rearwardly extending draw bars to which the attachment may be coupled, means being provided on the tractor for swinging the outer ends of the draw bars in vertical planes to vary the depth of the ground-engaging tools in the ground, and also whereby the tools may be quickly lifted out of the ground, as is necessary when turning corners or traveling from one place to another.

A further object is to provide in combination with a tractor embodying a pair of rearwardly extending draw bars having means for swinging the outer ends thereof in vertical planes, a cultivator attachment comprising two front units and a single rear unit, the front units being mounted for pivotal movement on the front end of the tractor to facilitate swinging the ground-engaging tools secured thereto into and out of the ground, and the rear cultivator unit being coupled directly to the rear ends of the tractor draw bars and having stabilizing members associated with said bars to prevent side swaying of the rear tractor unit when in operation, said rear cultivator unit having operative connections with the front cultivator units whereby when the rear unit is elevated to vary the depth of the rear ground-engaging tools in the ground, or to swing them completely out of the ground, a similar action is imparted to the front cultivator tools, thereby greatly simplifying the operation of the cultivator attachment when cultivating crops.

Other objects of the invention reside in the simple construction of the rear cultivator unit which comprises a simple frame provided with a forwardly extending portion for supporting certain of the ground-engaging tools in proximity to the axis of the rear tractor wheels and between said wheels, and other ground-engaging tools being mounted on said frame immediately back of the tractor rear wheels whereby all of the ground-engaging tools are located in close proximity to the rear axle and traction wheels of the tractor to make possible contour cultivation; in the unique manner of coupling the rear cultivator attachment to the front cultivator units whereby the ground-engaging tools of the front units may be vertically adjusted simultaneously with the rear ground-engaging tools; and in the provision of a rear cultivator attachment adapted for coupling to a conventional tractor provided with a hydraulic lift which is so constructed that it will not require any alterations be made in the construction of the tractor, and whereby the usual lift of the tractor may be employed for controlling the up-and-down movement of the ground-engaging tools relative to the ground.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal section substantially on the line 1—1 of the Figure 3, showing the ground-engaging tools at the front and rear of the tractor in operative position in the ground;

Figure 2 is a view similar to Figure 1 showing the ground-engaging tools elevated to an inoperative position;

Figure 3 is a plan view of Figure 1; and

Figure 4 is a rear view of the rear cultivator attachment, showing it detached from the tractor and the ground-engaging tools omitted.

In the selected embodiment of the invention herein disclosed, there is illustrated in Figures 1, 2 and 3, for purposes of disclosure, a conventional tractor comprising the usual body 2, front axle and its wheels 3 and 4, respectively, the rear axle housing, generally designated by the numeral 5, rear traction wheels 6, and an operator's seat 7.

The particular form of tractor here shown is well known to the trade and comprises rearwardly extending draw bars 8 pivoted to the rear axle 5, as shown at 9, and extending rearwardly therefrom as shown in Figure 3. Lifting arms 11 are shown secured to the ends of a rockshaft 12 of the tractor, and have connecting links 13 connecting them to the intermediate portions of the draw bars 8, as clearly illustrated in Figure 3. The rockshaft 12 is a part of the hydraulic lifting mechanism of the tractor, and is operated by hydraulic means not shown in the drawings.

The novel rear cultivator attachment featured in this application is shown comprising longitudinal transverse frame member 14 which preferably extends the full width of the tractor, or is of such length as to accommodate the maximum number of tools to be mounted on said frame member. Pivot pins 15 are shown mounted in suitable brackets 16 fixedly secured to the frame member 14 and depending therefrom, as best shown in Figure 4. The pins 15 are adapted to be received in apertures provided in the rear end of the draw bars 8, as indicated in dotted lines in Figure 3, thereby to couple the frame member 14 thereto.

The frame member 14 is provided intermediately of its ends with a forwardly extending frame portion comprising side members 17 having their rear ends suitably secured to the member 14 by such means as welding, and having their forward ends secured together by a cross member 18 preferably by welding, thereby to provide a rigid frame structure. The frame members 14, 17 and 18 are preferably constructed of standard tubular steel bars of square cross section, as shown in Figures 1 and 2, whereby maximum strength is obtained with the least possible weight. Obviously the frame members 14, 17 and 18 may be constructed of metallic bars otherwise shaped, cross sectionally, without departing from the scope of the invention.

Mounted on top of the frame members 14, 17 and 18 is a super-structure, generally designated by the numeral 19. This super-structure is in the form of an inverted V and comprising upwardly and inwardly disposed members 21 having their lower ends suitably secured to the upper face of the frame member 14 and terminating at their upper ends in upwardly directed spaced ears 22 which are suitably apertured and cooperate to provide means for pivotally connecting one end of a link 23 thereto. The opposite end of the brace member 23 is shown connected to a bell crank 24, shown operatively connected to the usual spring actuated trip 25 of the conventional hydraulic lift of the tractor.

To rigidly support the members 21 upon the frame member 14, forwardly extending diagonal braces 26 are shown having their upper ends secured to the upstanding ears 22 of the members 21 by such means as a bolt 27, and the forward ends of the members 26 may be welded or otherwise permanently secured to the frame members 17 and 18 where said parts are joined together, as best illustrated in Figure 3.

The upper link 23 is a part of the tractor lift and functions to prevent relative rotary or tilting movement of the rear cultivator frame about an axis disposed transversely of the tractor, when the cultivator attachment is vertically moved from one position to another.

The front cross member 18 of the cultivator frame provides means for supporting a plurality of ground-engaging tools, generally designated by the numeral 28, and the rear longitudinal frame member 14 is adapted to support a plurality of ground-engaging tools 29 and 31. The means provided for securing the ground-engaging tools to their respective transverse members 14 and 18 is well known in the art, and therefore, need not herein be described in detail. It is also to be understood that various forms of ground-engaging tools may be utilized, depending upon the nature of the crop to be cultivated. It is to be further understood that any number of ground-engaging tools may be mounted upon the frame members 14 and 18, as may be deemed necessary to obtain the desired results when cultivating.

To prevent side sway of the rear cultivator attachment, suitable stabilizers 32 are provided, one adjacent to each draw bar, as best shown in Figure 3. The stabilizers 32 have their forward ends connected to pivots 34 supported in brackets 33 secured to the rear axle housing and are shown having their ends coupled to the pivot pins 15 of the rear frame member 14, to which the rear ends of the draw bars 8 are coupled. By referring to Figure 3 it will be noted that the pivot pins 9 and 34 at each side of the median plane of the tractor are spaced a considerable distance apart, whereas the outer ends of each draw bar and its complemental stabilizing bar are spaced in close proximity. By this arrangement it will be readily understood that side sway of the cultivator frame relative to the tractor body is positively eliminated.

Secured to the front axle 3 adjacent to each front wheel, are forwardly extending brackets 35 and 36 which cooperate to support a bar 37 having rearwardly extending tool-supporting arms 38 and 39 adjustably secured thereto and to which the usual ground-engaging tools 40 are adjustably mounted. The two rockshafts or bars 37 mounted adjacent to the tractor front wheels are each provided with an upstanding lever arm 41 having the forward ends of a pair of connecting rods 42 connected thereto by suitable pivot pins 43. The rear ends of the rods 42 are operatively engaged with upright brackets 44 secured to the frame member 14, and suitable collars or nuts 45 on the rods 46 prevent relative longitudinal movement of the rods 42 in the brackets 44.

By thus operatively connecting the front cultivator units to the rear cultivator unit, when the rear cultivator unit is vertically adjusted by operation of the usual hydraulic lift of the tractor, a similar adjustment is imparted to the front cultivator units, as will be understood by reference to Figures 1 and 2, where it will be noted the ground engaging tools are shown in different positions.

In the accompanying drawings I have shown the rear cultivator attachment coupled to a tractor embodying a hydraulic lift. It is to be understood that it may be used in connection with tractors having mechanically operated lifts which are so designed that when the cultivator attachment is operated to change the position of the ground-engaging tools with relation to the ground, the action imparted to the rear cultivator attachment will be similar to the action obtained with the form of lift herein disclosed.

The operation of coupling the rear cultivator attachment to the tractor is extremely simple in that all it requires is to couple the rear ends of the draw bars 8 to the pivot pins 15 of the frame member 14, and the rear end of the brace member 23 to the upstanding ears 22 of the superframe 19, by inserting a pivot pin 47 through aligned apertures provided in the ears 22 and the brace member 23. Suitable cotter pins may be inserted in the coupling pins 15 and 47 to retain said coupling pins against accidental displacement. The hydraulic lift of the tractor shown in Figures 1 and 2 provides a very convenient lifting mechanism for the rear cultivator attachment, in that its operation is simple, positive, and instantaneous, by the simple manipulation of a single control lever, not shown. It will also be noted that the particular arrangement of the brace member 23 with respect to the draw bars 8 is such as to provide, in effect, a parallel link motion, whereby the rear cultivator unit does not relatively rotate about an axis disposed transversely of the tractor, when shifting the cultivator frame from one elevation to another in the operation of the cultivator.

If the front cultivator units are not required for a given operation, they may be quickly detached from the front axle and the rear ends of the connecting rods 42 disengaged from the brackets 44, as will be understood.

The complete apparatus as shown in Figures 1 and 2 including the front and rear cultivator units does not complicate the operation of the apparatus because of the operative connections provided between the front and rear cultivator units, by the rods 42, whereby they may be vertically adjusted simultaneously when the lifting mechanism is operated to so adjust the ground-engaging tools. It will also be noted by reference to the drawings that the rear cultivator attachment is extremely simple and inexpensive in construction and embodies few working parts.

The frame parts, including frame members 14, 17 and 18 and the superstructure 19, may be welded together as an integral unit, whereby maximum strength and rigidity is obtained with a minimum of weight. It will also be noted by reference to Figure 1, that when the rear cultivator attachment is uncoupled from the tractor, it is self-supporting, that is, it may assume substantially the position shown in Figure 1, except that the ground-engaging tools may be supported on the top surface of the ground. When so positioned, the operation of coupling the rear cultivator attachment to the tractor becomes an extremely simple one, and in like manner the operation of uncoupling the rear attachment from the tractor is similarly simple.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In combination with a tractor having a rear axle housing equipped with traction wheels and having rearwardly extending draw bars and means for raising or lowering the rear ends of the draw bars, a cultivator attachment comprising a frame including an elongated member disposed transversely of the tractor with its end portions in close proximity to the peripheries of the rear tractor wheels, rearwardly thereof, said frame having an intermediate integral portion extending forwardly from said elongated frame member between the tractor rear wheels with its foremost portion disposed adjacent to the axle housing and in parallel relation thereto, and a plurality of ground-working tools secured to said elongated frame member and to said foremost frame portion, whereby all of said tools are disposed in close proximity to the tractor rear wheels so that their working depth in the soil may be accurately controlled.

2. In combination with a tractor having a rear axle housing equipped with traction wheels and having rearwardly extending draw bars and a lifting mechanism for raising or lowering the rear ends of the draw bars, a cultivator attachment comprising a frame having means for coupling it to the rear ends of the draw bars, said frame including an elongated member disposed transversely of the tractor with its end portions in close proximity to the peripheries of the rear tractor wheels, a rectangular frame portion rigidly secured to said elongated member intermediately thereof and extending forwardly from said elongated frame member between the tractor rear wheels with its foremost portion disposed adjacent to the axle housing, ground-working tools secured to said rectangular frame portion and to said elongated frame member, an upright frame structure permanently secured to said elongated frame member and extending upwardly therefrom a substantial distance and carrying a coupling pin at its upper end, and a link having one end connected to said coupling pin and its opposite end to the tractor rear axle housing, above the draw bars, and cooperating with said draw bars to prevent relative rotary movement of the cultivator frame about a transverse axis, when the cultivator frame is raised or lowered.

3. A rear cultivator attachment for tractors, comprising an elongated member disposed transversely to the direction of travel and the length of which is substantially equal to the maximum width of a farm tractor, said elongated member having a rectangular frame portion permanently secured to its intermediate portion and extending forwardly thereof, the width of said forwardly extending frame portion crosswise to the direction of travel being such that it may be received between the rear wheels of the tractor to which the attachment is to be coupled, coupling pins secured to said elongated member and disposed therebeneath and spaced apart lengthwise of the member, upright frame members having their lower ends secured to said elongated member adjacent to said coupling pins and extending upwardly and inwardly and having their upper terminals bent upwardly and secured together in spaced relation and providing a pair of spaced ears which are apertured to receive a coupling pin, diagonal braces having their upper ends secured to the upper ends of said upwardly extending frame members and having their lower ends secured to said rectangular frame portion at the front corners thereof, and means on said elongated frame member and on the forward end of said rectangular frame portion for adjustably supporting a plurality of ground-working tools.

CLARENCE J. CARLSON.

REFERENCES CITED

The following references are of record in the file of this patent:

UNITED STATES PATENTS

| Number | Name | Date |
|---|---|---|
| 1,872,238 | Brown | Aug. 16, 1932 |
| 2,145,007 | Foster | Jan. 24, 1939 |
| 2,159,669 | Morkoski | May 23, 1939 |
| 2,174,808 | Tuft | Oct. 3, 1939 |
| 2,296,501 | Carlson | Sept. 22, 1942 |
| 2,359,206 | Currie | Sept. 26, 1944 |
| 2,390,767 | Alderman | Dec. 11, 1945 |